US008814454B2

(12) United States Patent
Ito (10) Patent No.: US 8,814,454 B2
(45) Date of Patent: Aug. 26, 2014

(54) IMAGE PROCESSING DEVICE (71) Applicant: Sakae Ito, Kitanagoya (JP)

(72) Inventor: Sakae Ito, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/845,357

(22) Filed: Mar. 18, 2013

(65) Prior Publication Data
US 2013/0255989 A1 Oct. 3, 2013

(30) Foreign Application Priority Data

Mar. 29, 2012 (JP) ................................ 2012-077007

(51) Int. Cl.
B41J 29/02 (2006.01)
G03G 21/16 (2006.01)

(52) U.S. Cl.
CPC .... *G03G 21/1619* (2013.01); *G03G 2221/1678* (2013.01); *G03G 2221/1687* (2013.01)
USPC ............................ 400/693; 399/110; 399/380

(58) Field of Classification Search
CPC ............................. G03G 21/1619; B41J 29/02
USPC ........... 399/123, 379, 380, 110; 400/691–693
See application file for complete search history.

(56) References Cited

U.S. PATENT DOCUMENTS

| 7,570,898 | B2 | 8/2009 | Onose et al. |
| 2004/0056926 | A1* | 3/2004 | Samoto ........................... 347/50 |
| 2007/0047024 | A1 | 3/2007 | Onose et al. |
| 2010/0018749 | A1* | 1/2010 | Wu ............................... 174/135 |
| 2011/0235082 | A1* | 9/2011 | Mukai ......................... 358/1.13 |
| 2011/0235140 | A1 | 9/2011 | Ito et al. |

FOREIGN PATENT DOCUMENTS

| JP | 2003-241443 A | 8/2003 |
| JP | 2005-258025 A | 9/2005 |
| JP | 2007-067811 A | 3/2007 |
| JP | 2011-205341 A | 10/2011 |

* cited by examiner

*Primary Examiner* — Matthew G Marini
(74) *Attorney, Agent, or Firm* — Banner & Witcoff, Ltd.

(57) ABSTRACT

An image processing device is provided with a first unit, a second unit attached to the first unit rotatably around a rotational axis, flat cables connecting elements in the first unit with elements in the second unit, and a guide member having wiring paths each defined between two of separations walls, the guide member guiding, from the first unit to the second unit, the flat cables laid through the wiring paths, respectively, in a state spaced apart from each other in a thickness direction thereof without contacting each other, at least one of the separation walls including a curving wall curving to surround the rotational axis, at least one of the flat cables guided to have a curving section along the curving wall, a first extension extending continuously from the curving section to the first unit, and a second extension extending continuously from the curving section to the second unit.

7 Claims, 8 Drawing Sheets

IMAGE PROCESSING DEVICE

CROSS-REFERENCE TO RELATED APPLICATION

This application claims priority under 35 U.S.C. §119 from Japanese Patent Application No. 2012-077007 filed on Mar. 29, 2012. The entire subject matter of the application is incorporated herein by reference.

BACKGROUND

1. Technical Field

The following description relates to one or more techniques for an image processing device that includes a first unit and a second unit attached to the first unit via a hinge so as to be rotatable relative to the first unit.

2. Related Art

An image forming device has been known that includes a device main body containing an image forming unit, and a document feeder attached to an upper side of the device main body in an openable and closable manner.

In general, the known image forming device includes a controller and a power supply unit disposed in the device main body. Further, the document feeder is controlled by the controller disposed in the device main body. Therefore, the known image forming device further includes a flat cable provided between the device main body and the document feeder to establish a connection therebetween.

SUMMARY

In the meantime, a multi-function device may include, on the upper side of a device main body, various elements to be controlled and/or a communication device in addition to a document feeder as described above. In this case, a plurality of flat cables might have to be provided between a lower unit such as the device main body (hereinafter referred to as a first unit) and an upper unit disposed above the first unit (hereinafter referred to as a second unit).

However, in such a case, when the plurality of flat cables are merely arranged alongside of each other, it might lead to an enlarged space required for wiring of the plurality of flat cables, and thus might result in problems such as an enlarged size and an undesired looking of the multi-function device. Meanwhile, when the plurality of flat cables are tied or stacked into a single bundle, it might result in a problem that noises caused in a flat cable is likely to enter into another flat cable due to the mutually contacting flat cables. Accordingly, desired is a wiring structure for the plurality of flat cables to avoid the aforementioned problems.

Aspects of the present invention are advantageous to provide one or more improved techniques, for image processing devices, which make it possible to put, into a compact-size structure, wiring paths for a plurality of flat cables laid between the first unit and the second unit and to prevent the plurality of flat cables from contacting each other.

According to aspects of the present invention, an image processing device is provided, which includes a first unit, a second unit attached to the first unit via a hinge so as to be rotatable relative to the first unit around a rotational axis, at least one of the first unit and the second unit containing one of an image reading unit configured read an image from an object to be read and an image forming unit configured to form an image on a recording medium, a plurality of flat cables configured to connect electrical elements disposed in the first unit with electrical elements disposed in the second unit, and a guide member having a plurality of wiring paths each defined between two of a plurality of separation walls, the guide member being configured to guide, from one to another of the first and second units, the plurality of flat cables laid through the plurality of wiring paths, respectively, in a state spaced apart from each other in a thickness direction of the plurality of flat cables without contacting each other, at least one of the plurality of separation walls including a curving wall formed to curve so as to surround the rotational axis, at least one of the plurality of flat cables being guided so as to have a curving section that curves along the curving wall, a first extension that extends continuously from the curving section to the first unit, and a second extension that extends continuously from the curving section to the second unit.

According to aspects of the present invention, further provided is an image processing device that includes a first unit, a second unit attached to the first unit so as to be rotatable relative to the first unit around a rotational axis, a plurality of flat cables configured to connect electrical elements disposed in the first unit with electrical elements disposed in the second unit, and a guide member having a plurality of wiring paths each defined between two of a plurality of separation walls, the guide member being configured to guide, from one to another of the first and second units, the plurality of flat cables laid through the plurality of wiring paths, respectively, in a state spaced apart from each other in a thickness direction of the plurality of flat cables without contacting each other, at least one of the plurality of separation walls including a curving wall formed to curve so as to surround the rotational axis, at least one of the plurality of flat cables being guided so as to have a curving section that curves along the curving wall, a first extension that extends continuously from the curving section to the first unit, and a second extension that extends continuously from the curving section to the second unit.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described in detail with reference to the accompanying drawings. It is noted that, in the following description, a front side, a rear side, a left side, a right side, an upside, and a downside of a multi-function peripheral 1 of the embodiment will be defined as indicated in the accompanying drawings, merely for the sake of explanatory convenience.

[Configuration of Multi-Function Peripheral]

Figure 1A:
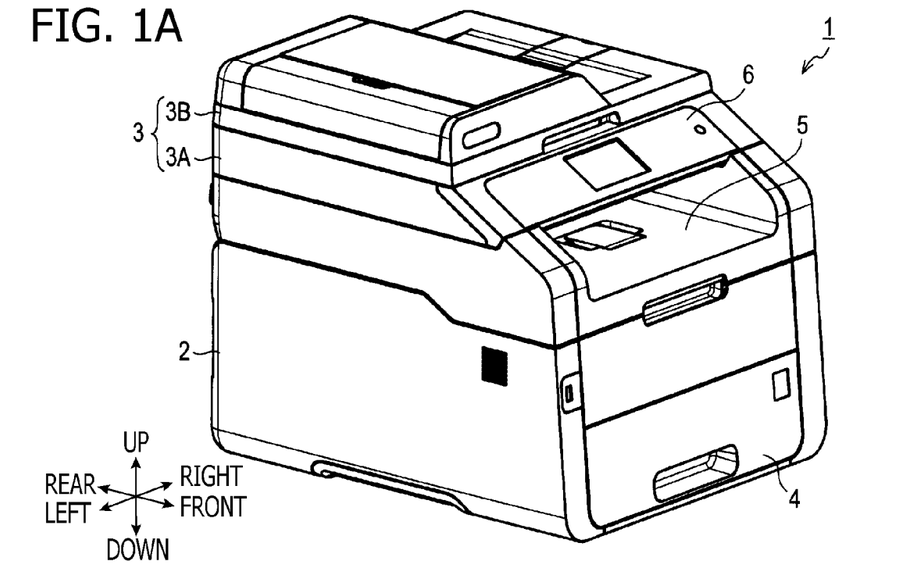
FIG. 1A is a perspective view showing a multi-function peripheral when a reading unit is in a closed position in an embodiment according to one or more aspects of the present invention.
Figure 1B:
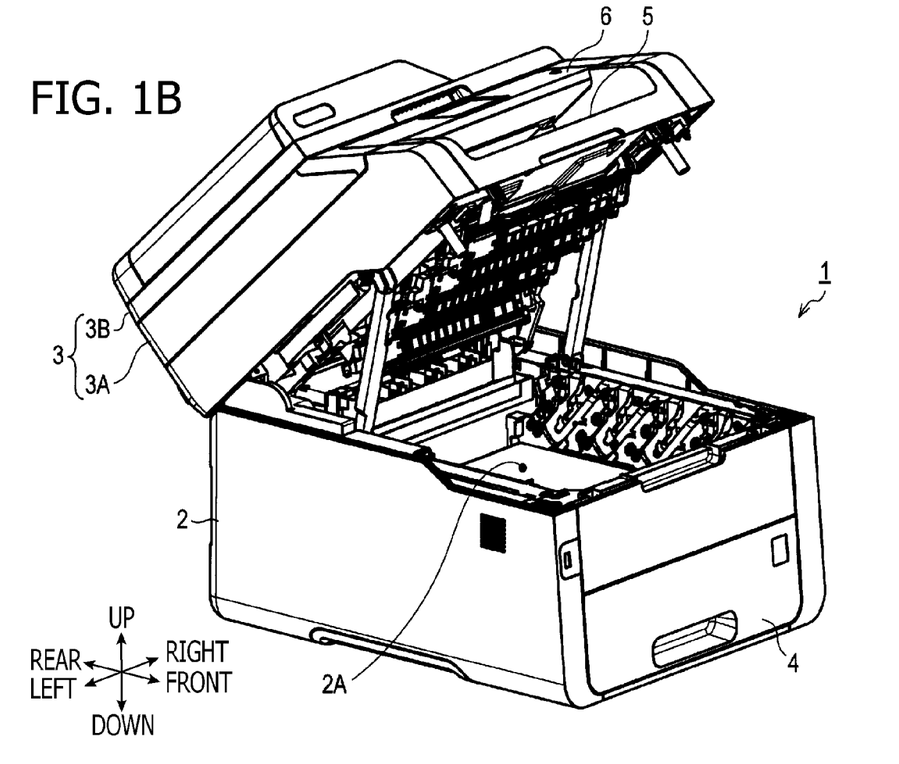
FIG. 1B is a perspective view showing the multi-function peripheral when the reading unit is in an open position in the embodiment according to one or more aspects of the present invention.
Figure 8:
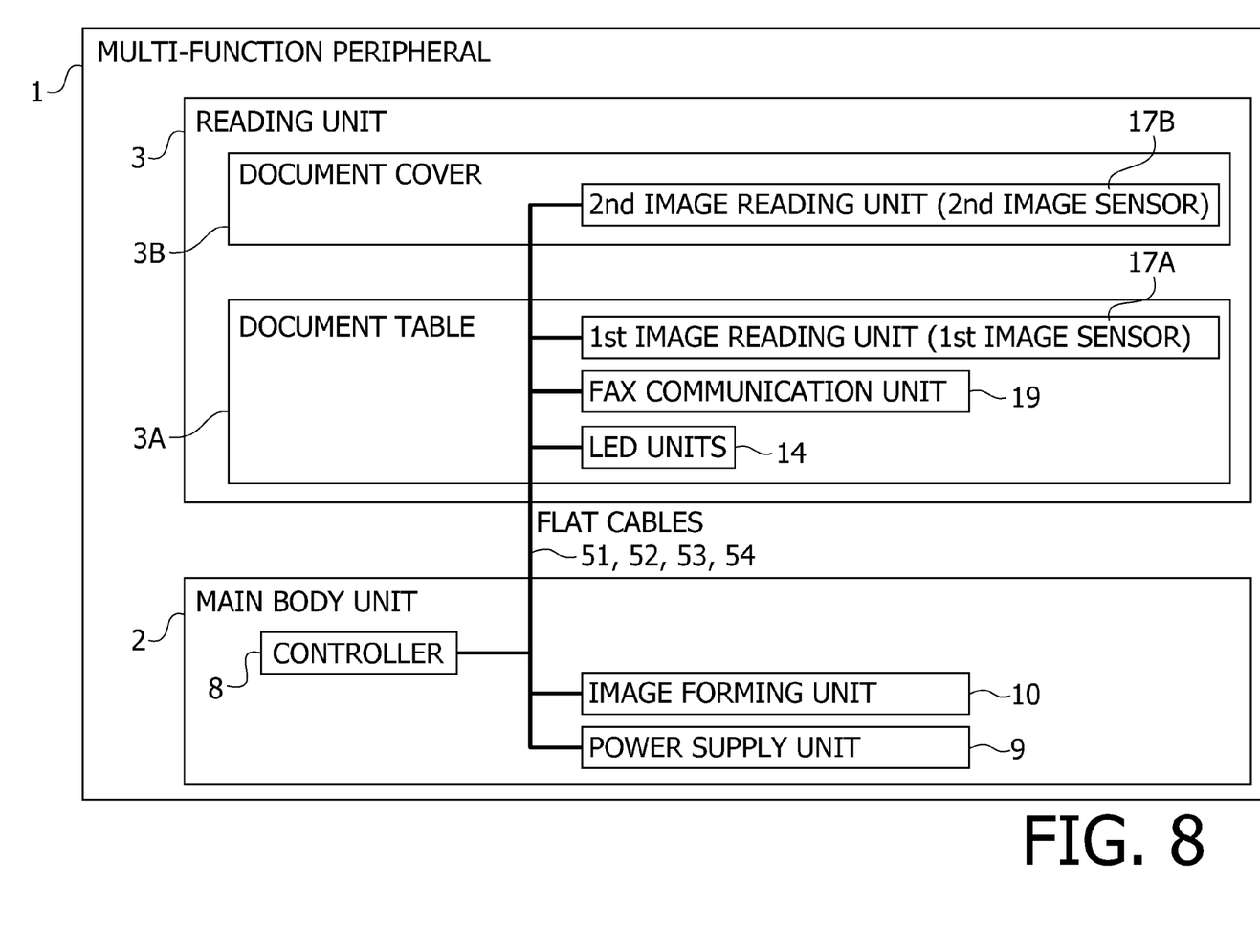
FIG. 8 is a block diagram schematically showing an electrical configuration of the multi-function peripheral in the embodiment according to one or more aspects of the present invention.

As shown in FIGS. 1A and 1B, the multi-function peripheral 1 includes a main body unit 2, and a reading unit 3 disposed above the main body unit 2. The main body unit 2 includes thereinside an image forming unit 10 (see FIG. 2), a controller 8, and a power supply unit 9 (see FIG. 8). Further, the reading unit 3 includes a document table 3A and a document cover 3B. The document table 3A includes thereinside a first image reading unit and a facsimile communication unit 19 (see FIG. 8). In addition, the document cover 3B includes thereinside a second image reading unit and an automatic document feeder (ADF) (see FIG. 8). Various electrical elements (such as the aforementioned elements) provided to the main body unit 2 and the reading unit 3 are controlled by the controller 8 disposed inside the main body unit 2.

The reading unit 3 is configured to rotate relative to the main body unit 2 around a rotational center axis, which extends in a left-to-right direction near an upper rear portion of the main body unit 2. Along with the rotation, the reading unit 3 moves between a closed position shown in FIG. 1A and an open position shown in FIG. 1B.

When the reading unit 3 is rotated and moved to the open position, an opening 2A provided at an upper side of the main body unit 2 is opened (exposed to the outside of the multi-function peripheral 1). Thus, in this state, it is possible to do maintenance for the elements (such as the image forming unit 10, the controller 8, and the power supply unit 9) disposed inside the main body unit 2. Meanwhile, when the reading unit 3 is rotated and moved to the closed position, the reading unit 3 serves as a cover for covering the opening 2A.

Further, in the reading unit 3, the document cover 3B is configured to rotate relative to the document table 3A around a rotational center axis, which extends in the left-to-right direction near an upper rear portion of the document table 3A. When the document cover 3B is rotated and moved to an open position, a contact glass provided at an upper side of the document table 3A is exposed to the outside of the multi-function peripheral 1. Thereby, a document sheet to be read is allowed to be placed on the contact glass. Meanwhile, when rotated and moved to a closed position, the document cover 3B is put into a state to cover the contact glass.

There is a feed cassette 4 attached to a lower portion of the main body unit 2. The feed cassette 4 is configured to accommodate recording medium to be supplied for printing. At a front side of the reading unit 3, an ejection port 5 is formed to allow a user to take out printed sheets. Above the ejection port 5, there is disposed an operation panel 6 for accepting user operations therethrough.

Figure 2:
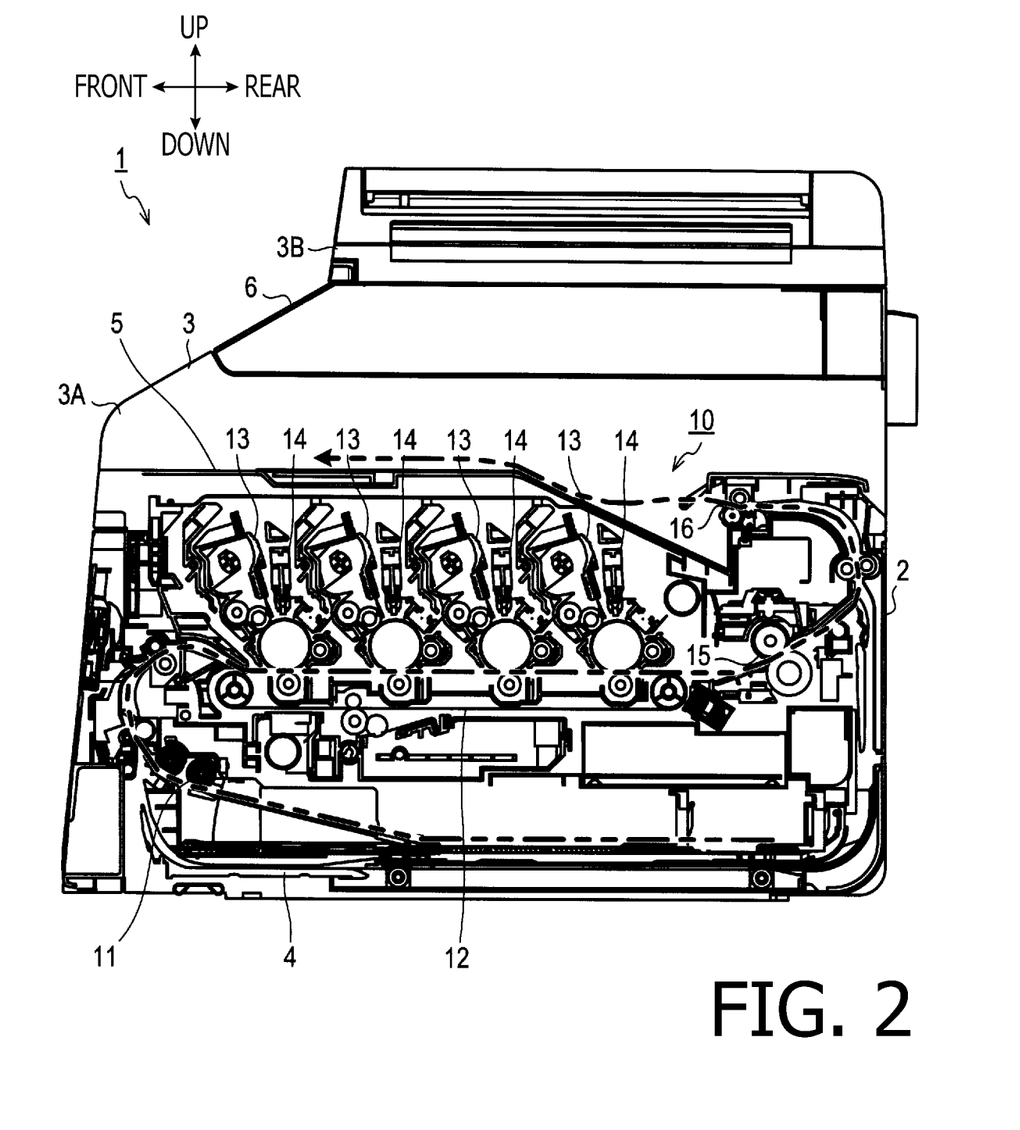
FIG. 2 is a vertical cross-sectional view showing an internal configuration of a main body unit in the embodiment according to one or more aspects of the present invention.

Next, the image forming unit 10 of the multi-function peripheral 1 will be described. In the multi-function peripheral 1, the image forming unit 10 as shown in FIG. 2 is incorporated inside the main body unit 2. The image forming unit 10 is a tandem-type image forming device configured to electrophotographically form an image. The image forming unit 10 includes a feeding unit 11, a belt unit 12, process cartridges 13, LED units 14, a fuser 15, and an ejection unit 16.

The feeding unit 11 is configured to feed the recording medium (such as recording sheets) held in the feed cassette 4 to a downstream side of a feeding path (indicated by a long dashed double-short dashed line in FIG. 2).

The belt unit 12 is configured to convey from front to back the recording medium fed by the feeding unit 11 while pinching the recording medium with the process cartridges 13. The process cartridges 13 are four cartridges tandemly arranged at regular intervals above the belt unit 12. Each process cartridge 13 includes a photoconductive body and a development unit for developing an electrostatic latent image formed on the photoconductive body.

The LED units 14 are four units tandemly arranged at regular intervals to correspond so as to the process cartridges 13, respectively. Each LED unit 14 is configured to irradiate the photoconductive body of a corresponding process cartridge 13 with light and form the electrostatic latent image on the photoconductive body. The electrostatic latent image formed on the photoconductive body by each LED unit 14 is developed by the development unit of the corresponding process cartridge 13 to produce a toner image. Then, the toner image is transferred onto the recording medium on the belt unit 12. The LED units 14 are attached to a bottom surface of the reading unit 3. Therefore, when the reading unit 3 is rotated and moved to the open position (see FIG. 1B), the LED units 14 is moved upward together with the reading unit 3 to be farther away from the process cartridges 13.

The fuser 15 is configured to thermally fix the toner image onto the recording medium by heating and pressing the recording medium with the toner image transferred thereon while pinching the recording medium between rollers. After passing through the fuser 15, the recording medium is ejected from the ejection unit 16. Thus, the user is allowed to take out the recording medium from the ejection port 5.

Figure 3:
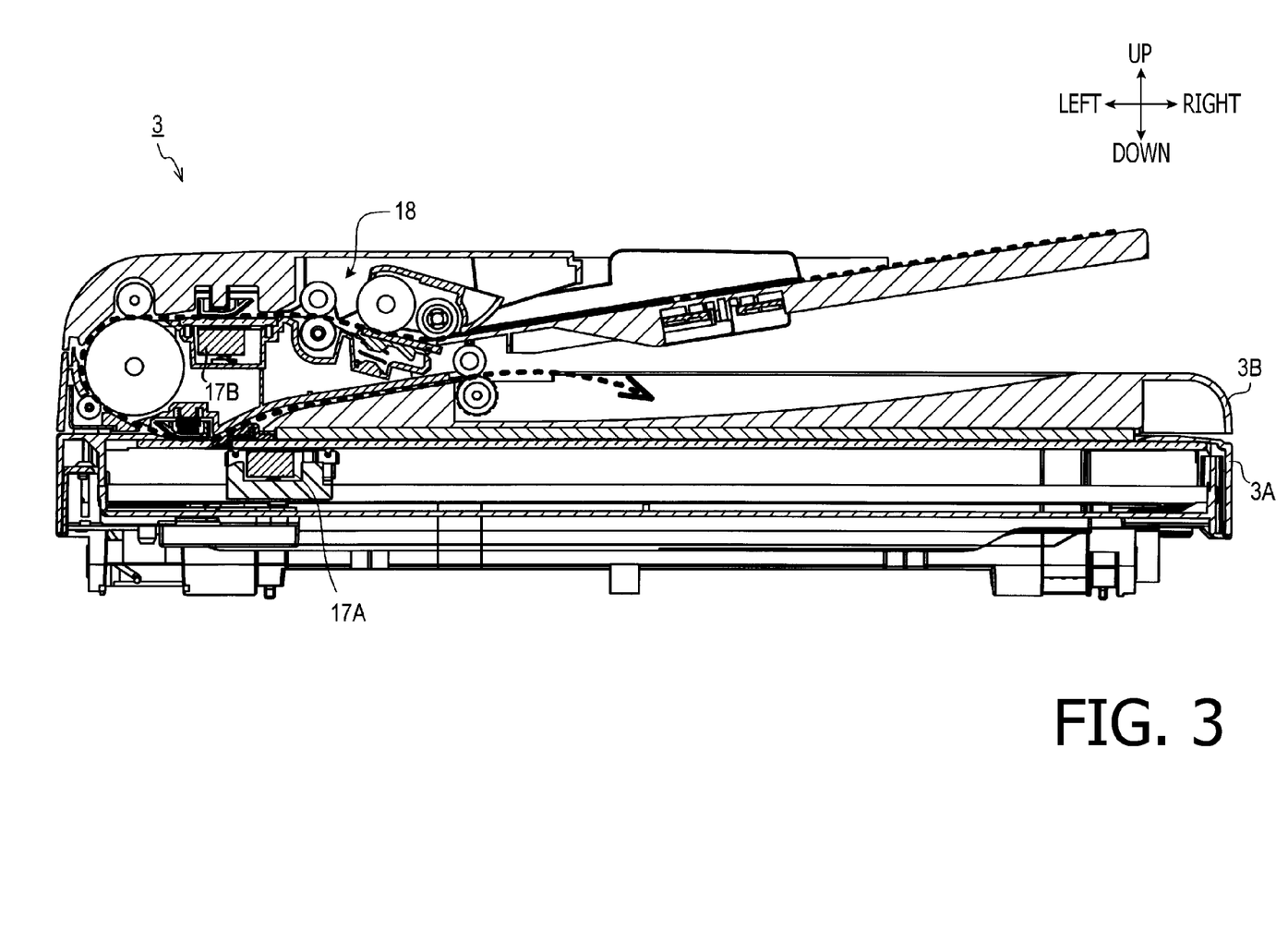
FIG. 3 is a vertical cross-sectional view showing an internal configuration of the reading unit in the embodiment according to one or more aspects of the present invention.

Subsequently, explanations will be provided about the first image reading unit, the second image reading unit, and the ADF unit of the multi-function peripheral 1. In the multi-function peripheral 1, as shown in FIG. 3, the reading unit 3 includes a first image sensor 17A that forms the first image reading unit, and a second image sensor 17B that forms the second image reading unit. The first image sensor 17A is disposed at the side of the document table 3A and is configured to reciprocate along the left-to-right direction. In addition, the second image sensor 17B is tightly attached to a frame at the side of the document cover 3B.

Further, the document cover 3B includes a feeding mechanism 18 incorporated therein, which forms the ADF unit. The feeding mechanism 18 is configured to feed a document sheet along a predetermined feeding path (indicated by a dashed line in FIG. 3). The feeding mechanism 18 includes a plurality of rollers and a guide member for guiding the document sheet fed by the rollers along the aforementioned feeding path.

The reading unit 3 configured as above is usable as a flatbed-type image scanner and an ADF-type image scanner as well. When utilized as the flatbed-type image scanner, the reading unit 3 reads an image of the document sheet with the first image sensor 17A. Further, when utilized as the ADF-type image scanner, the reading unit 3 is allowed to read an image from one side of the document sheet with one of the first image sensor 17A and the second image sensor 17B or read images from both sides of the document sheet with both the first image sensor 17A and the second image sensor 17B.

[Wiring Structure for Flat Cables]

Subsequently, an explanation will be provided about a wiring structure of flat cables provided between the main body unit 2 and the reading unit 3.

Figure 4:
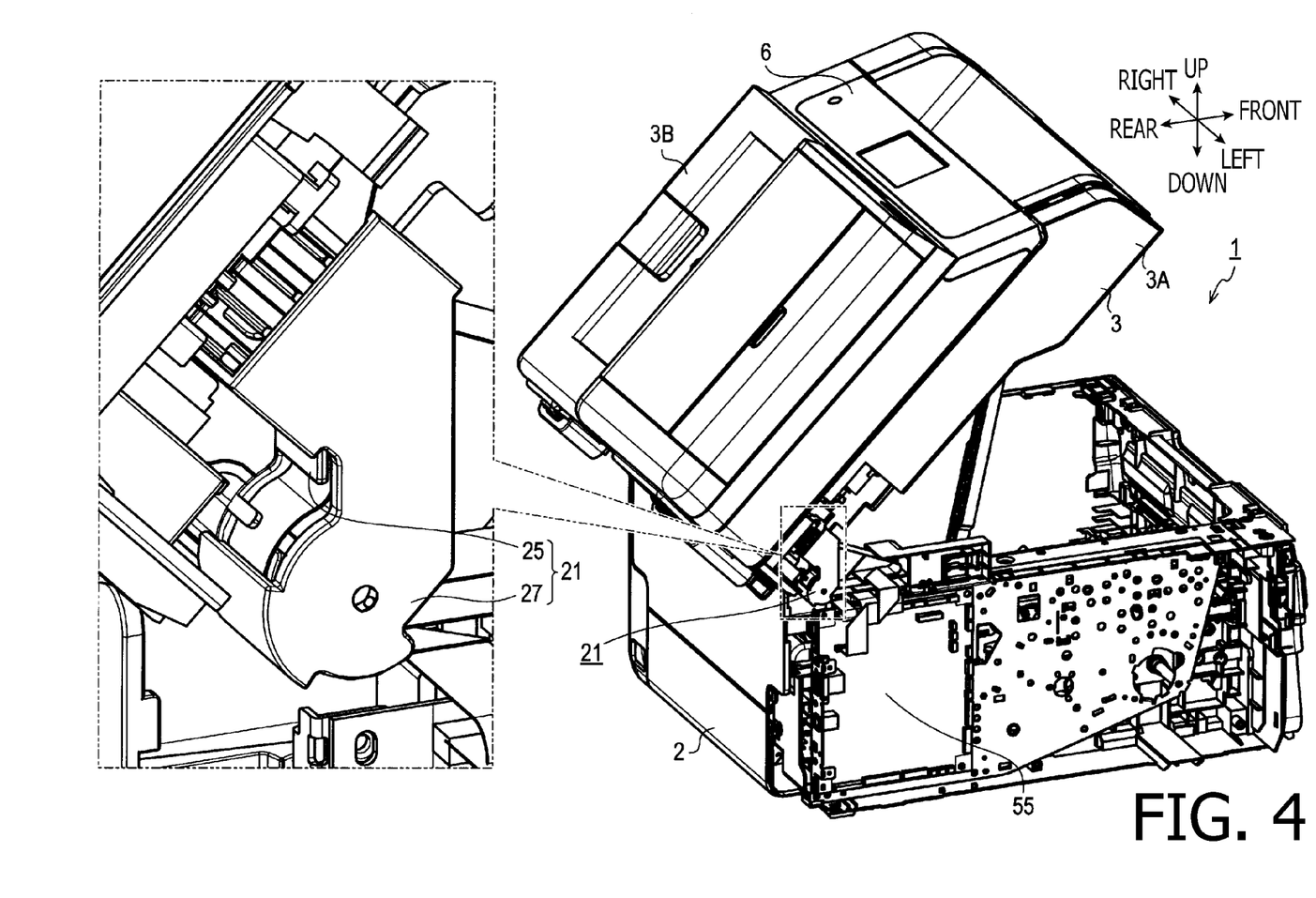
FIG. 4 is an enlarged perspective view showing a part of the multi-function peripheral around a guide member in the embodiment according to one or more aspects of the present invention.
Figure 5:
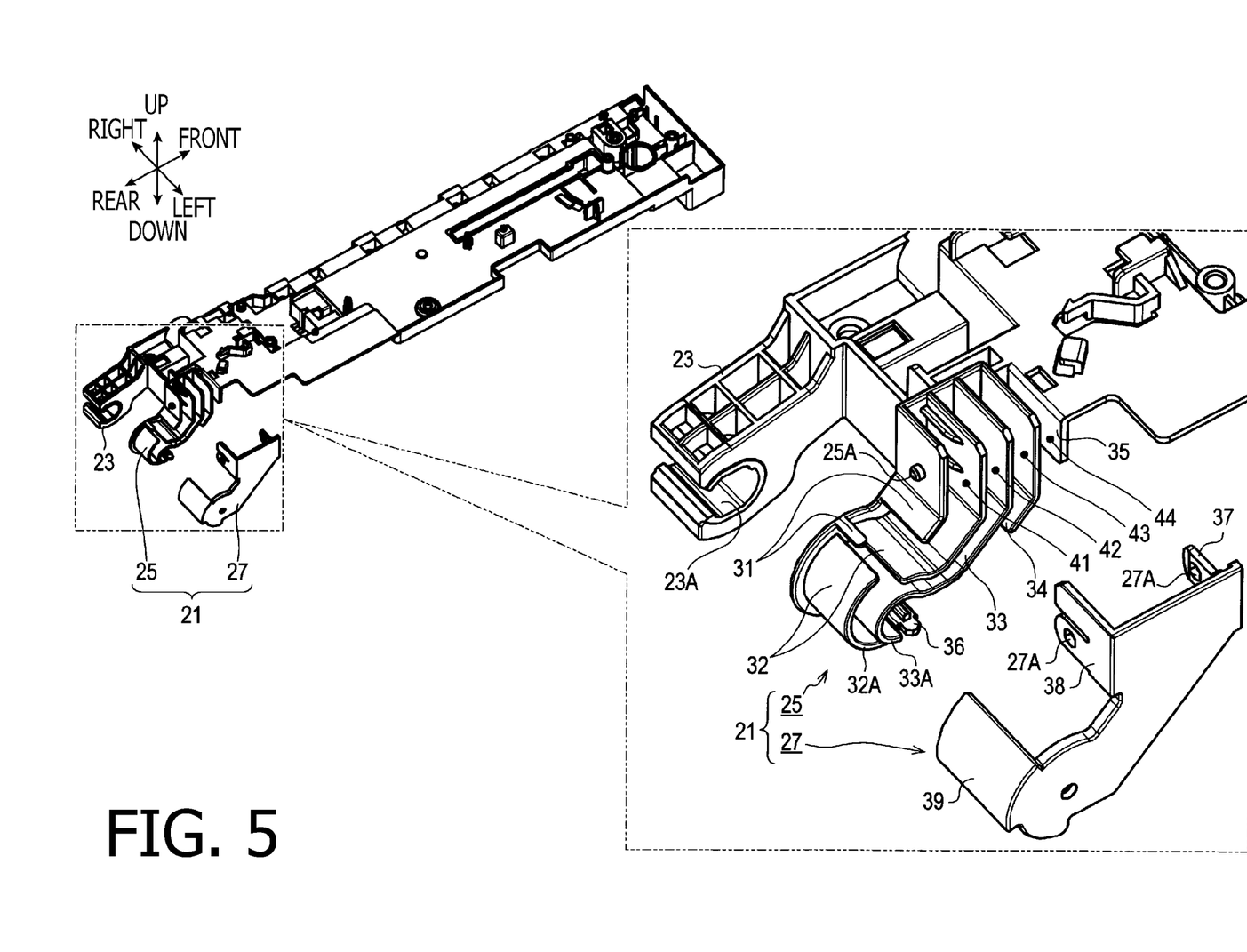
FIG. 5 is an enlarged exploded view showing the guide member of the multi-function peripheral in the embodiment according to one or more aspects of the present invention.

In the multi-function peripheral 1, as shown in FIG. 4, a guide member 21 is disposed near an upper rear left end of the main body unit 2. As shown in FIG. 5, the guide member 21 includes a partition section 25 formed integrally with a hinge member 23, and a side cover 27 detachably attached to the partition section 25.

FIG. 4 shows a state where the side cover 27 is attached to the partition section 25. FIG. 5 shows a state where the side cover 27 is detached from the partition section 25. The partition section 25 includes two projections 25A (see FIGS. 5, 7A, and 7B). Meanwhile, the side cover 27 includes two holes 27A (see FIG. 5). When the side cover 27 is attached to the partition section 25, each of the projections 25A is engaged with a corresponding one of the holes 27A, and the side cover 27 is tightly attached to the partition section 25.

In order to attach the reading unit 3 to the main body unit 2 to be rotatable relative to the main body unit 2, the hinge member 23 is tightly attached to the reading unit 3 and attached to a shaft (not shown) fixed to the main body unit 2. Specifically, when the shaft (not shown) fixed to the main body unit 2 is clipped by a bearing portion 23A of the hinge member 23, the reading unit 3 is rotatably attached to the main body unit 2. Although the following configuration is not shown in any drawings, another hinge member 23 is provided near an upper rear right end of the main body unit 2. Thus, the reading unit 3 is supported by the two hinge members 23 so as to be rotatable relative to the main body unit 2.

The partition section 25 includes a first partition wall 31, a second partition wall 32, a third partition wall 33, a fourth partition wall 34, a fifth partition wall 35, and a shaft portion 36. The aforementioned two projections 25A are formed on the first partition wall 31 and the fifth partition wall 35, respectively. Further, the second partition wall 32 and the third partition wall 33 include curving walls 32A and 33A, respectively. The curving walls 32A and 33A are formed to curve so as to surround the rotational center of the reading unit 3 rotatable relative to the main body unit 2. In this regard, it is noted that although the rotational center of the reading unit 3 is located at an inner circumferential side of the curving walls 32A and 33A, a center of curvatures of the curving walls 32A and 33A is slightly deviated from the rotational center of the reading unit 3 rotatable relative to the main body unit 2.

More specifically, in the embodiment, the curving walls 32A and 33A are formed concentrically around the shaft portion 36 when viewed from the left side defined in FIG. 5. In other words, the shaft portion 36 is formed in a position coincident with the center of curvatures of the curving walls 32A and 33A. In this respect, however, the shaft portion 36 is not located in a position coincident with the rotational center of the reading unit 3 rotatable relative to the main body unit 2.

Namely, the curving walls 32A and 33A are formed to curve so as to surround the rotational center of the reading unit 3 rotatable relative to the main body unit 2, but it does not mean that the rotational center of the reading unit 3 rotatable relative to the main body unit 2 is positionally coincident with the center of curvatures of the curving walls 32A and 33A. Of course, the rotational center of the reading unit 3 rotatable relative to the main body unit 2 may be positionally coincident with the center of curvatures of the curving walls 32A and 33A. However, in the embodiment, the rotational center of the reading unit 3 rotatable relative to the main body unit 2 is intentionally deviated from the center of curvatures of the curving walls 32A and 33A. Advantageous effects of such a configuration will be described later.

Meanwhile, as shown in FIG. 5, the side cover 27 is formed integrally with two protruding sections 37 and 38 and a curving wall 39 that protrude toward the first to fifth partition walls 31 to 35. The aforementioned two holes 27A are formed in the protruding sections 37 and 38, respectively.

In the embodiment, there are four wiring paths defined by the first partition wall 31, the second partition wall 32, the third partition wall 33, the fourth partition wall 34, and the fifth partition wall 35 of the partition section 25 and the curving wall 39 of the side cover 27. Specifically, a first wiring path 41 is defined between the first partition wall 31 with the curving wall 39 and the second partition wall 32. A second wiring path 42 is defined between the second partition wall 32 and the third partition wall 33. A third wiring path 43 is defined between the third partition wall 33 and the fourth partition wall 34. A fourth wiring path 44 is defined between the fourth partition wall 34 and the fifth partition wall 35. Although not shown in FIGS. 6, 7A, and 7B, the curving wall 39, in collaboration with the first partition wall 31, forms the first wiring path 41 between the first partition wall 31 (with the curving wall 39) and the second partition wall 32, in a state where the side cover 27 is attached to the partition wall 25. Namely, the curving wall 39 is disposed in a position farther away from the shaft portion 36 than the curving wall 32A, so as to form a space between the curving wall 39 and the curving wall 32A. The formed space is utilized as the first wiring path 41. It is noted that the center of curvature of the curving wall 39 is positionally coincident with the shaft portion when the side cover 27 is attached to the partition section 25.

Figure 6:
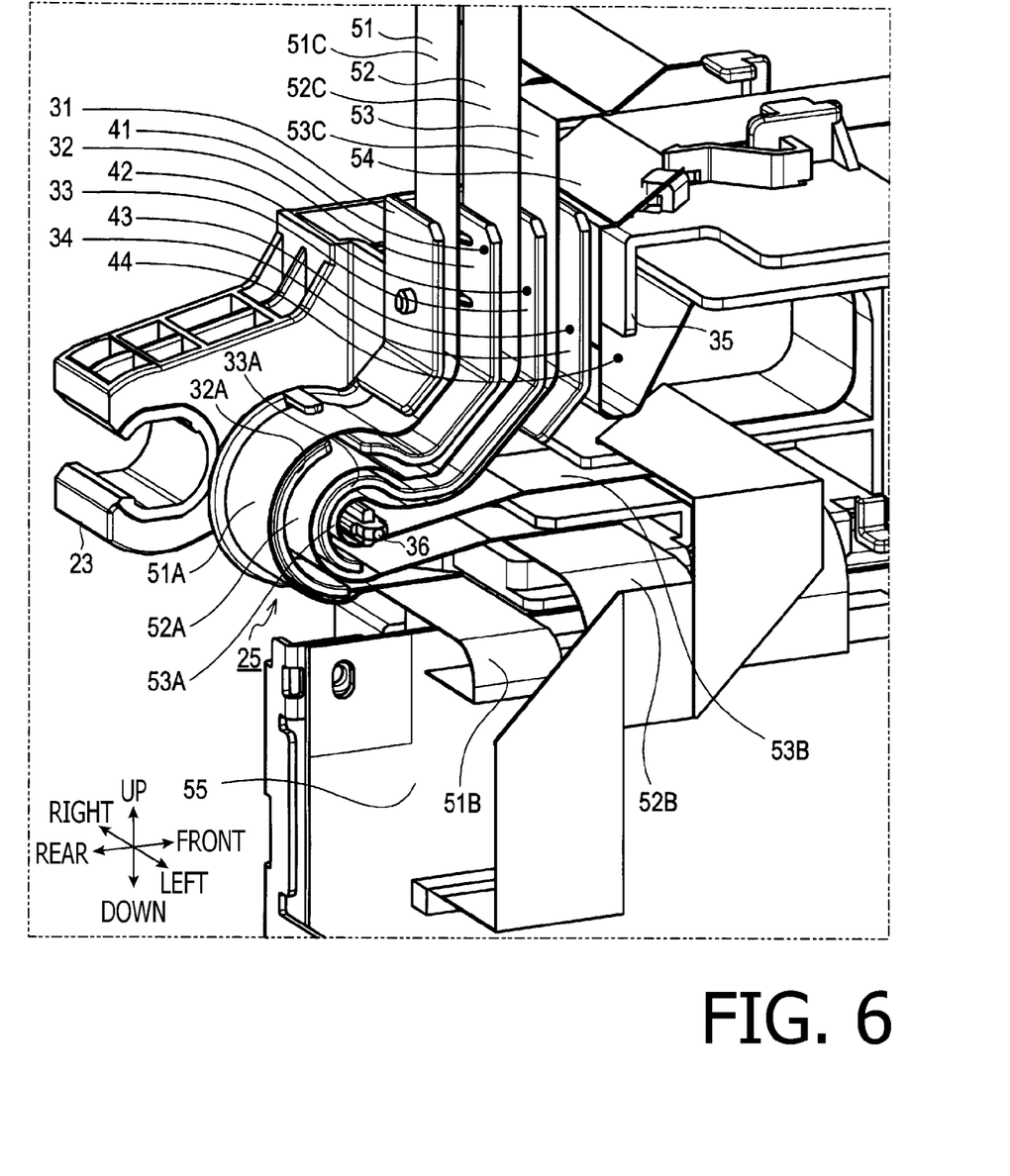
FIG. 6 is a perspective view showing a wiring state of flat cables around the guide member in the embodiment according to one or more aspects of the present invention.

As shown in FIG. 6, the four wiring paths 41 to 44 is configured to hold a plurality of flat cables 51 to 54 laid therethrough to establish electrical connections between the main body unit 2 and the reading unit 3. The plurality of flat cables 51 to 54 are laid through the four wiring paths 41 to 44, respectively, on a one-to-one basis. Thereby, the flat cables 51 to 54 are laid in a state spaced apart from each other in a thickness direction of the flat cables 51 to 54 without contacting each other.

In such a wiring configuration as above, the flat cables 51, 52, and 53 are put into such wiring states as to form curving sections 51A, 52A, and 53A, respectively, which curve along the curving walls 32A and 33A. In addition, the flat cables 51, 52, and 53 include first extensions 51B, 52B and 53B that extend continuously from the curving sections 51A, 52A, and 53A toward the main body unit 2, respectively. Further, the flat cables 51, 52, and 53 include second extensions 51C, 52C and 53C that extend continuously from the curving sections 51A, 52A, and 53A toward the reading unit 3, respectively. The first extensions 51B, 52B, and 53B of the flat cables 51, 52, and 53 are connected with a control board 55 provided in the main body unit 2. Moreover, the flat cables 51 to 54 are connected with a control board provided in the reading unit 3 to control the image sensors 17A and 17B that respectively form the first and second reading units, a modem that forms the facsimile communication unit 19, and the LED unit 14.

[Operations and Advantageous Effects]

Figure 7A:
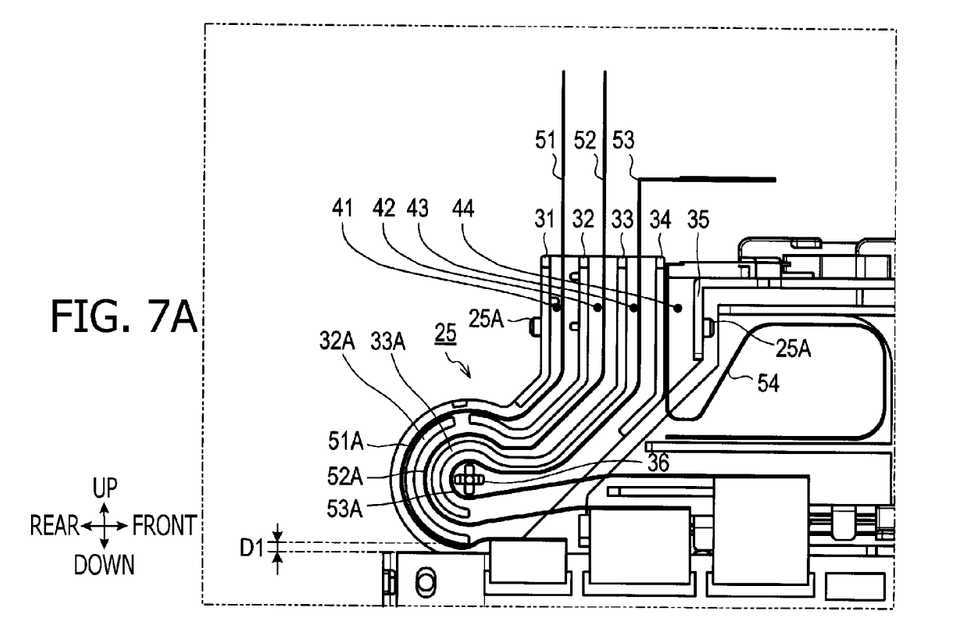
FIG. 7A is a side view showing respective positions of the flat cables in a state where the reading unit is in the closed position when viewed from the side of a left side surface in the embodiment according to one or more aspects of the present invention.
Figure 7B:
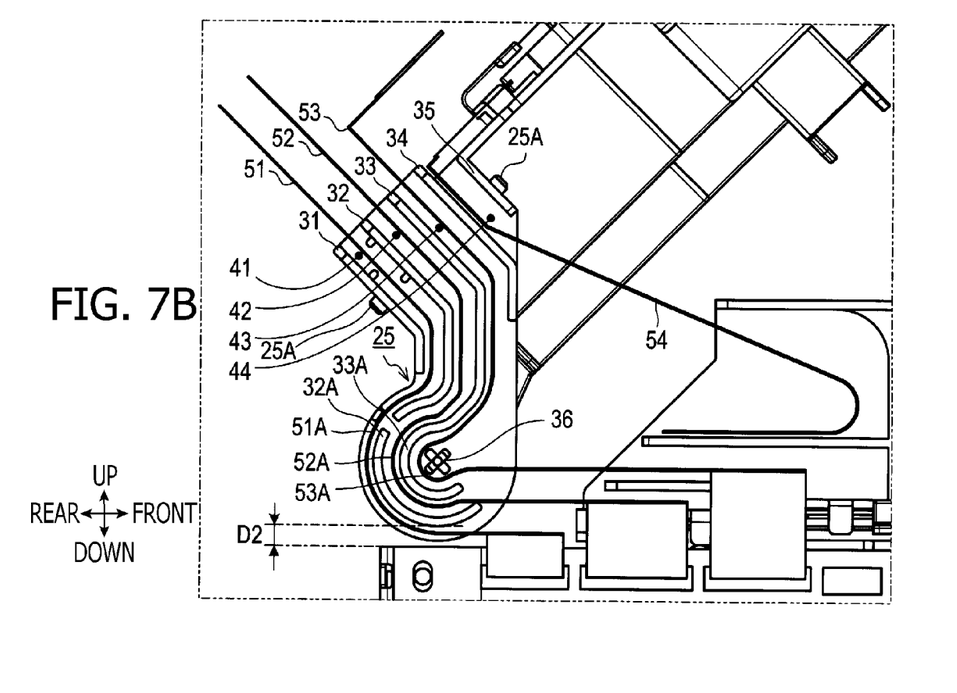
FIG. 7B is a side view showing respective positions of the flat cables in a state where the reading unit is in the open position when viewed from the side of the left side surface in the embodiment according to one or more aspects of the present invention.

In the multi-function peripheral 1 configured as above, when the reading unit 3 is rotated relative to the main body unit 2 and moved to the closed position or the open position, the flat cables 51 to 54 are moved and put into a state as shown in FIG. 7A or 7B. At this time, the flat cables 51 to 54 are moved without contacting each other while maintaining the state spaced apart from each other in the thickness direction thereof. Therefore, unlike when the partition section 25 is not provided, it is possible to prevent or suppress noises of signal lines in the flat cables 51 to 54 caused due to contact between flat cables.

Further, it is possible to achieve a more compact space required for laying the flat cables 51 to 54 than when the plurality of flat cables 51 to 54 are arranged in parallel to be spaced apart from each other in a width direction thereof.

Further, the flat cables 51, 52, and 53 are guided by the wiring paths along the curving walls 32A and 33A that curve to surround the rotational center of the reading unit 3. Therefore, even when the reading unit 3 is rotated relative to the main body unit 2, the curving sections 51A, 52A, and 53A are not greatly displaced. Thus, it is possible to better prevent the flat cables 51, 52, and 53 from being excessively pulled or excessively sagging than when the flat cables 51, 52, and 53 are laid in positions far away from the rotational center of the reading unit 3.

Further, the guide member 21 includes the side cover 27 detachably attached to a side face of the partition section 25 that is parallel to both an extending direction and the thickness direction of the flat cables 51 to 54. Therefore, when the side cover 27 is detached, the flat cables 51 to 54 is allowed to be easily put into and easily removed from the wiring paths 41 to 44 while moved along the width direction of the flat cables 51 to 54.

Accordingly, it is possible to more easily lay the flat cables 51 to 54 in the wiring paths 41 to 44 in an assembling process in comparison with such a configuration that the flat cables 51 to 54 have to be moved in a longitudinal direction thereof along the wiring paths 41 to 44 in order to put the flat cables 51 to 54 into the wiring paths 41 to 44 or remove the flat cables 51 to 54 from the wiring paths 41 to 44. Further, it is possible to more easily remove the flat cables 51 to 54 from the wiring paths 41 to 44 in a maintenance operation.

In the meantime, as described before, the center of curvatures of the curving walls 32A and 33A is slightly deviated from the rotational center of the reading unit 3 rotatable relative to the main body unit 2. Thereby, when the reading unit 3 is moved from the closed position (see FIG. 7A) to the open position (see FIG. 7B), a distance between an outer circumferential surface of the curving wall 32A and the main body unit 2 is enlarged from a distance D1 shown in FIG. 7A to a distance D2 shown in FIG. 7B.

Namely, the center of curvature of the curving wall 32A is set in such a position as to move upward near the rotational center of the reading unit 3 when the reading unit 3 is moved from the closed position to the open position. Accordingly, when the guide member 21 includes the curving wall 32A formed in the aforementioned position, even though the reading unit 3 is moved from the closed position to the open position, a width of the first wiring path 41 formed at the outer circumferential side of the curving wall 32A is not rendered narrower. Thus, there is no concern that the flat cable 51 might be pinched between the outer circumferential surface of the curving wall 32A and the main body unit 2.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, the same configurations as exemplified in the aforementioned embodiment will be provided with the same reference characters, and explanations about them will be omitted.

(Modification)

In the aforementioned embodiment, the multi-function peripheral 1 is exemplified, which includes the first and second image reading units, the facsimile communication unit 19, and the ADF provided at the side of the reading unit 3. However, the reading unit 3 may have an electrical configuration different from the above configuration. For instance, the reading unit 3 may be configured without at least one of the electrical elements such as the first and second image reading units, the facsimile communication unit 19, and the ADF. Further, the reading unit 3 may include another electrical element in addition to the first and second image reading units, the facsimile communication unit 19, and the ADF. Even in such a case, when a plurality of flat cables are arranged between the main body unit 2 and the reading unit 3, aspects of the present invention may be applied.

In the aforementioned embodiment, the four wiring paths 41 to 44 are formed by utilizing the guide member 21. In this respect, however, the number of the wiring paths is not limited to "four," and any number may be applied as the number of the wiring paths. When two or more wiring paths are required to be formed, aspects of the present invention may be applied. It is noted that one or more partition walls may be formed to define two or more wiring paths. Namely, with respect to each partition wall formed, two regions separated thereby may be utilized as wiring paths. In other words, it is optional whether to utilize as a wiring path a region of which two sides are defined by partition walls or a region of which only one side is defined by a partition wall.

Further, even when three or more regions are separated or defined by a plurality of partition walls, it is optional whether to utilize all the three or more regions as wiring paths. For instance, when two or more regions are arbitrarily selected from among the three or more regions and utilized as wiring paths, the remaining region(s) may be utilized for another purpose other than the use as wiring paths, or may not necessarily be used.

In the aforementioned embodiment, the image processing device configured as a multi-function peripheral is exemplified. However, it is optional whether the image processing device according to aspects of the present invention is to be configured as a multi-function peripheral. Aspects of the present invention may be applied to a single-function device such as a single-function image reading device, a single-function image forming device, a copy machine, or a facsimile machine.

What is claimed is:

1. An image processing device comprising:
   a first unit;
   a second unit attached to the first unit via a hinge so as to be rotatable relative to the first unit around a rotational axis, at least one of the first unit and the second unit containing one of an image reading unit configured read an image from an object to be read and an image forming unit configured to form an image on a recording medium;
   a plurality of flat cables configured to connect electrical elements disposed in the first unit with electrical elements disposed in the second unit; and
   a guide member having a plurality of wiring paths each defined between two of a plurality of separation walls, the guide member being configured to guide, from one to another of the first and second units, the plurality of flat cables laid through the plurality of wiring paths, respectively, in a state in which the plurality of flat cables are spaced apart from each other in a thickness direction of the plurality of flat cables without contacting each other, at least one of the plurality of separation walls comprising a curving wall formed to curve and surround the rotational axis, at least one of the plurality of flat cables being guided have:
   a curving section that curves along the curving wall;
   a first extension that extends continuously from the curving section to the first unit; and
   a second extension that extends continuously from the curving section to the second unit.

2. The image processing device according to claim 1, wherein
   the first unit contains the image forming unit,
   the first unit has an opening provided at an upper side thereof,
   the opening is formed to allow replacement of components of the image forming unit, and
   the second unit serves as a cover for covering the opening.

3. The image processing device according to claim 1, wherein
   the guide member comprises a side cover detachably attached to a side face thereof that is parallel to an extending direction and the thickness direction of the plurality of flat cables.

4. The image processing device according to claim 3, wherein
   when the side cover is detached from the side face of the guide member, the plurality of flat cables are allowed to be put into and removed from the plurality of wiring paths while being moved along a width direction of the plurality of flat cables.

5. The image processing device according to claim 1, wherein:
   the first unit comprises a controller configured to control elements included in the image processing device,
   the second unit comprises the image reading unit, and
   at least one of the plurality of flat cables is provided between the controller and the image reading unit.

6. The image processing device according to claim 1, wherein:
   the second unit is configured to, while rotating relative to the first unit, move between a first position where the second unit covers an upper side of the first unit and a second position where the second unit is spaced apart from the upper side of the first unit, and
   the curving wall is formed in such a position as to satisfy an inequality expression "$D1<D2$," where $D1$ represents a distance between an outer circumferential surface of the curving wall and the first unit when the second unit is in the first position, and $D2$ represents a distance between the outer circumferential surface of the curving wall and the first unit when the second unit is in the second position.

7. An image processing device comprising:
   a first unit;
   a second unit attached to the first unit so as to be rotatable relative to the first unit around a rotational axis;
   a plurality of flat cables configured to connect electrical elements disposed in the first unit with electrical elements disposed in the second unit; and
   a guide member having a plurality of wiring paths each defined between two of a plurality of separation walls, the guide member being configured to guide, from one to another of the first and second units, the plurality of flat cables laid through the plurality of wiring paths, respectively, in a state in which the plurality of flat cables are spaced apart from each other in a thickness direction of the plurality of flat cables without contacting each other, at least one of the plurality of separation walls comprising a curving wall formed to curve and surround the rotational axis, at least one of the plurality of flat cables being guided have:
   a curving section that curves along the curving wall;
   a first extension that extends continuously from the curving section to the first unit; and
   a second extension that extends continuously from the curving section to the second unit.

* * * * *